(12) United States Patent
Keni et al.

(10) Patent No.: US 7,962,484 B2
(45) Date of Patent: Jun. 14, 2011

(54) LDAP BULK APPEND

(75) Inventors: Ajay Keni, Fremont, CA (US); Neelima Bawa, Bangalore (IN)

(73) Assignee: Oracle International Corporation, Redwod Shores, CA (US)

( * ) Notice: Subject to any disclaimer, the term of this patent is extended or adjusted under 35 U.S.C. 154(b) by 187 days.

(21) Appl. No.: 11/293,021

(22) Filed: Dec. 2, 2005

(65) Prior Publication Data

US 2006/0149760 A1 Jul. 6, 2006

Related U.S. Application Data

(60) Provisional application No. 60/633,346, filed on Dec. 3, 2004.

(51) Int. Cl.
*G06F 17/30* (2006.01)
(52) U.S. Cl. ........................................................ 707/736
(58) Field of Classification Search ........................ None
See application file for complete search history.

(56) References Cited

U.S. PATENT DOCUMENTS

| | | | | | |
|---|---|---|---|---|---|
| 5,634,053 | A | * | 5/1997 | Noble et al. | 707/4 |
| 5,974,407 | A | * | 10/1999 | Sacks | 707/2 |
| 6,052,681 | A | * | 4/2000 | Harvey | 707/3 |
| 6,199,062 | B1 | * | 3/2001 | Byrne et al. | 707/3 |
| 6,236,988 | B1 | * | 5/2001 | Aldred | 707/3 |
| 6,321,259 | B1 | * | 11/2001 | Ouellette et al. | 709/220 |
| 6,347,312 | B1 | * | 2/2002 | Byrne et al. | 707/3 |
| 6,356,892 | B1 | * | 3/2002 | Corn et al. | 707/3 |
| 6,732,160 | B2 | * | 5/2004 | Ambrosini et al. | 709/218 |
| 6,985,905 | B2 | * | 1/2006 | Prompt et al. | 707/102 |
| 7,076,488 | B2 | * | 7/2006 | Bollich | 707/10 |
| 7,200,627 | B2 | * | 4/2007 | Stickler | 707/205 |
| 7,209,925 | B2 | * | 4/2007 | Srinivasan et al. | 707/602 |
| 2003/0076933 | A1 | * | 4/2003 | Ranalli et al. | 379/88.17 |
| 2003/0154305 | A1 | * | 8/2003 | Bethmangalkar et al. | 709/245 |
| 2003/0187996 | A1 | * | 10/2003 | Cardina et al. | 709/228 |
| 2006/0047641 | A1 | | 3/2006 | Keni | |
| 2006/0123024 | A1 | | 6/2006 | Sathyanarayan et al. | |

* cited by examiner

*Primary Examiner* — Neveen Abel-Jalil
*Assistant Examiner* — Jacques Veillard
(74) *Attorney, Agent, or Firm* — Vista IP Law Group, LLP.

(57) ABSTRACT

Systems and methods for performing a bulk append into an LDAP Server Directory Store. A conversion tool may receive an input file in LDIF format. The conversion tool performs a schema check on each entry in the input file, and creates a plurality of output files in SQL or another LDAP database structured format. One output file is created for each attribute in the input file. In addition, a file for an attribute table and a file for a catalog table may be created. One or more SQL Loading tools then load the output files into the LDAP Server Directory Store in parallel, except for the DN catalog table. After the other output files have been loaded, the DN catalog file is loaded into the LDAP Server Directory Store.

27 Claims, 7 Drawing Sheets

LDAP BULK APPEND

RELATED APPLICATION

This application claims the benefit of U.S. Provisional Application Ser. No. 60/633,346, filed on Dec. 3, 2004, entitled "LDAP Bulk Append," which is hereby incorporated by reference in its entirety.

FIELD

This invention relates to computer systems, and more particularly to retrieval of data.

BACKGROUND

Many applications servers contain directories to aid clients in fast lookup of information. For example, within a database system, an application server such as the Oracle Application Server may contain a directory, such as the Oracle Internet Directory.

Lightweight Directory Access Protocol (LDAP) is an Internet protocol that applications may use to look up information. An LDAP server may allow applications to access information contained in directories.

Much of the LDAP operations traffic against an LDAP server is read-centric. In many telecommunications applications where LDAP servers are the identity repositories, there is a common requirement to not only hold large number of entries in the LDAP repository, but also to provision large number of entries on an ongoing basis. This may also be true in other applications where the internet identities are provisioned in the LDAP server.

The requirement to provision in bulk a large number of LDAP entries into an LDAP Server repository which already has a large number of entries presents many challenges. This act of bulk-add or bulk-append should ensure that the LDAP Server does not consume additional resources such that the LDAP Service that it provides to run-time applications is adversely affected. This should also be handled appropriately in an LDAP Replication Network since this is a very common topology for large LDAP deployments.

SUMMARY

Embodiment of the invention relate to systems and methods for processing data and for bulk-appending the processed data into an LDAP server repository.

In one implementation, a conversion tool may receive an input file in LDIF format. The conversion tool performs a schema check on each entry in the input file, and creates a plurality of output files in SQL or another LDAP database structured format. One output file is created for each attribute in the input file. In addition, a file for an attribute table and a file for a catalog table may be created. One or more SQL Loading tools then load the output files into the LDAP Server Directory Store in parallel, except for the catalog table. After the other output files have been loaded, the catalog file is loaded into the LDAP Server Directory Store.

DETAILED DESCRIPTION

Overview

Typically, the LDAP entries that need to be provisioned in bulk (bulk-appended) into the LDAP Server are available in the LDAP data interchange format (LDIF) in a flat file. LDIF is the data format used to represent LDAP entries in a flat file.

A conversion tool, referred to in one implementation as Datagen, may be used to process the input LDIF file and prepare it for bulk-append into the LDAP repository, also referred to as the Directory Store. Datagen processes each LDIF entry in the input file and produces a number of output files. These output files can be loaded into the Directory Store.

Once the entries have been processed, they may be loaded into the LDAP Server Directory Store. The entries may be loaded, for example, in parallel using a database tool such as the Structured Query Language (SQL) Loader tool, also known as the sql*ldr tool.

Figure 1:
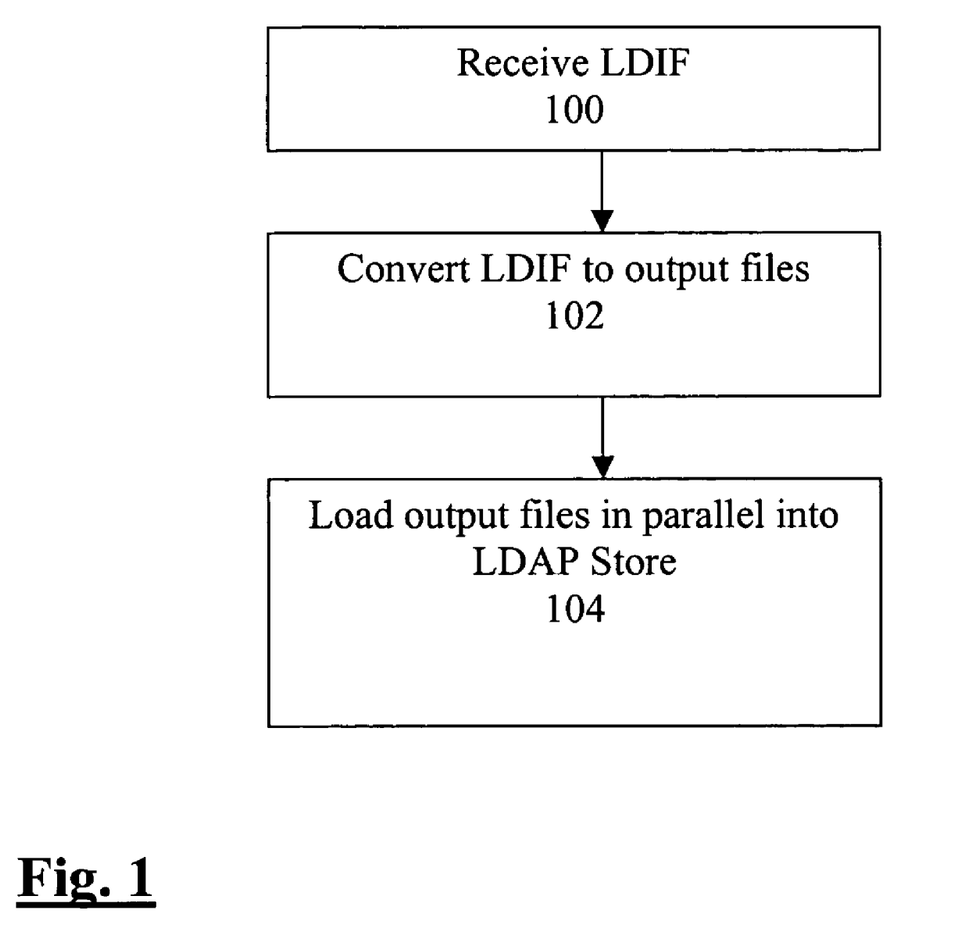
FIG. 1 is a flow chart illustrating a method for performing a bulk append, in accordance with an embodiment of the invention.

FIG. 1 is a flow chart illustrating a method for performing a bulk append. As shown in FIG. 1, the method may begin in step 100, wherein an input file, such as an LDIF file, may be received. In step 102, the LDIF file may be converted into one or more output files. In step 104, the output files may be loaded in parallel into an LDAP Server Directory Store.

Figure 2:
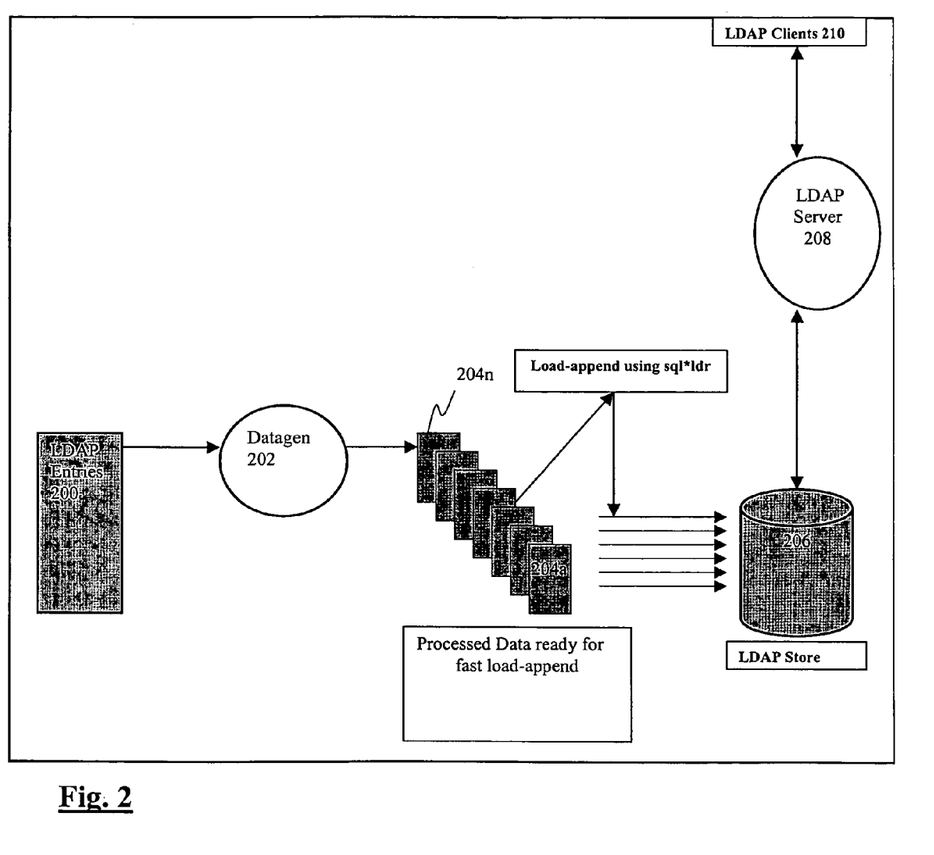
FIG. 2 is a block diagram illustrating a system for performing a bulk append, in accordance with an embodiment of the invention.

FIG. 2 is a block diagram illustrating a system for performing a bulk append. As shown in FIG. 2, LDAP Entries 200 may be received by a conversion tool 202, such as the Datagen conversion tool. The LDAP Entries 200 received may be, for example, an LDIF file.

The conversion tool 202 may process the LDAP Entries 200 to create one or more output files 204*a-n*. The output files 204*a-n* may be appended into an LDAP Server Directory Store 206. The output files 204*a-n* may be loaded, for example, in parallel. The information stored in the LDAP Server Directory Store 206 may then be available to one or more LDAP clients 210 via an LDAP Server 208.

Conversion of LDIF to Output Files

The conversion 102 of LDIF files to output files 208 will now be described with reference to FIGS. 3-4. The conversion process may include performing a schema check on the input LDIF file, and generating one or more output files.

Figure 3:
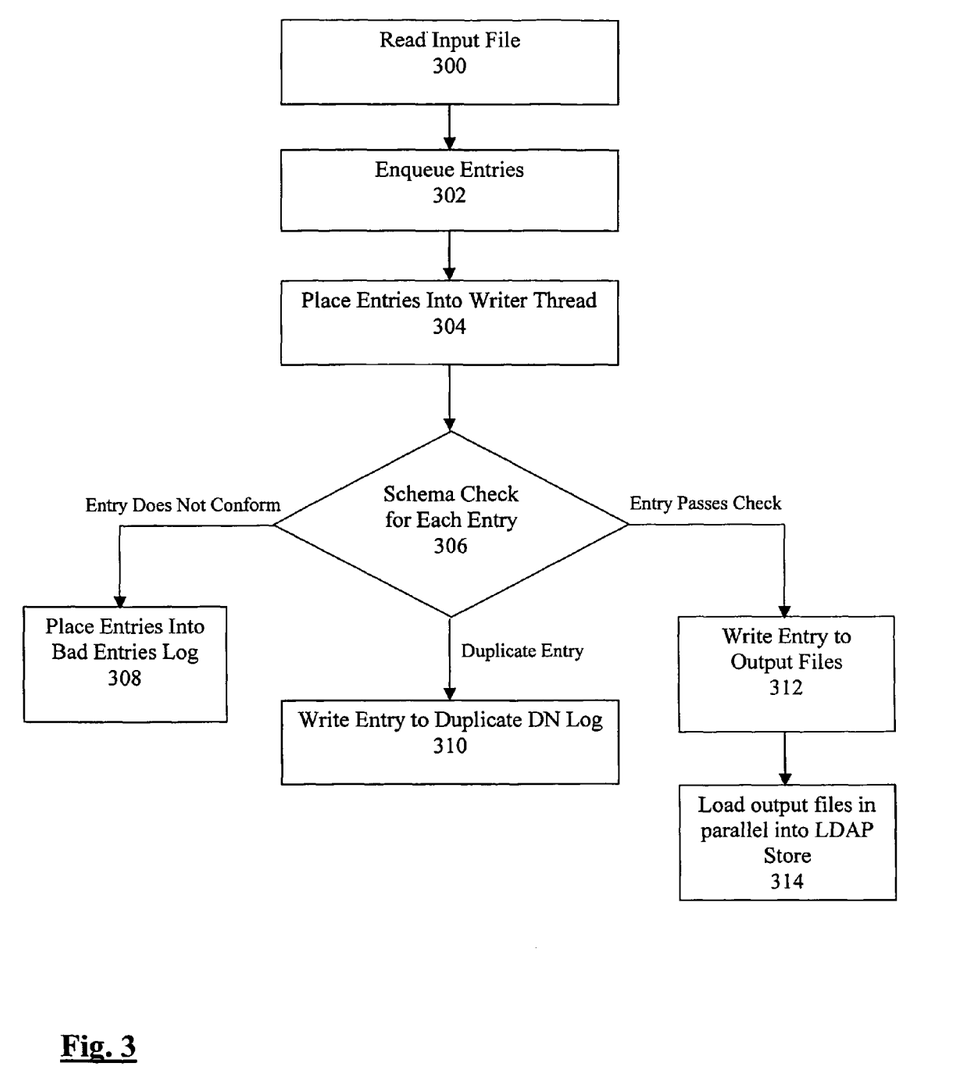
FIG. 3 is a flow chart illustrating a method for generating output files, in accordance with an embodiment of the invention.

Referring to FIG. 3, a method for converting files may begin in step 300, wherein an input file, such as an LDIF file, may be read. In step 302, each entry in the input file may be enqueued into a work queue. In step 304, entries may be dequeued from the work queue and placed into a writer thread. In step 306, a schema check may be performed. The schema check may include, for example, performing a check on the appropriate LDIF entries to ensure that they conform to the defined LDAP schema. Entries that do not conform to the defined LDAP schema may be placed in a bad entries log 308. The schema check may also include, for example, performing a check on the appropriate LDIF entries to ensure that there are no duplicate entries in the input LDIF file and the current directory content. This may include, for example, examining the distinguished name (DN) for each entry. Duplicate entries may be placed into a duplicate DN log 310.

For entries that pass the schema check, the method may continue in step 312, wherein the entry may be processed and written to an output file. In step 314, the output files may be loaded into an LDAP Server Directory Store.

A plurality of output files may be generated by the method of FIG. 3. For example, one output file may be generated for each table in the relational schema of the LDAP Server Directory Store. Each of these output files contains the data that needs to be loaded into the corresponding table in the relational schema of the LDAP Server Directory Store. Additional files may also be generated. For example, files for an attribute table and catalog tables may be generated.

For example, if there are 60 "searchable" attributes in the LDAP schema, then 60 attribute output files may be generated, i.e., one for each searchable attribute. Furthermore, additional output files may be generated. For example, one output file may be generated for an attribute table, and another output file may be generated for a catalog table.

Figure 4:
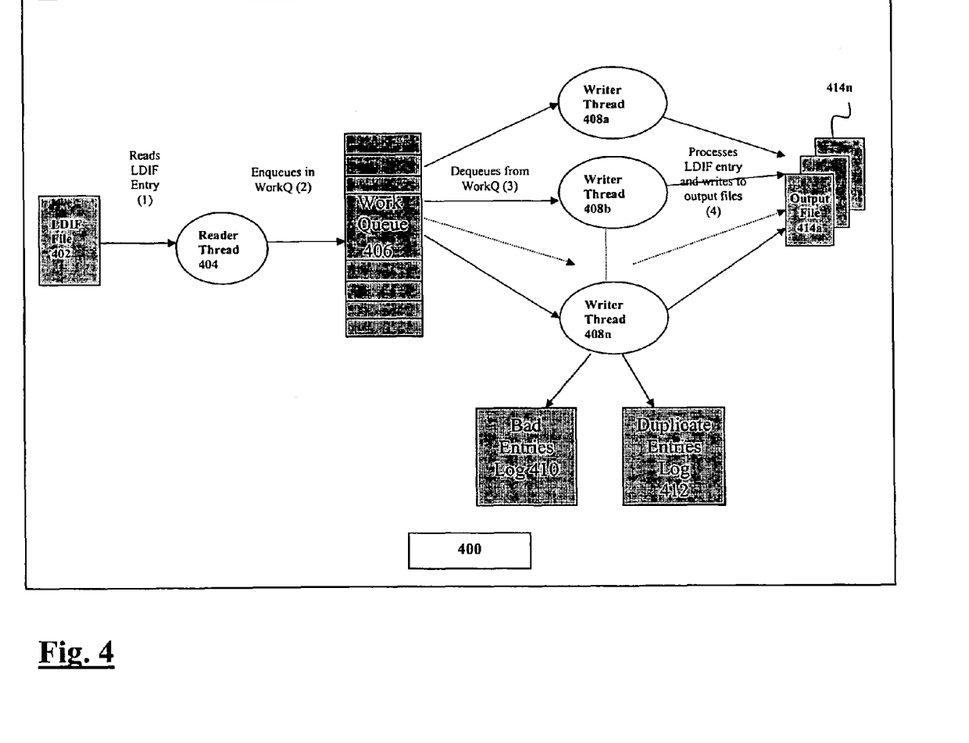
FIG. 4 is a block diagram illustrating a system for generating output files, in accordance with an embodiment of the invention.

The conversion of an input file to one or more output files may be performed by a conversion tool 400, such as the Datagen tool, as shown in FIG. 4.

As shown in FIG. 4, an input file 402, such as an LDIF file, may be read by a reader thread 404. Each entry in the input file 402 may be enqueued into a work queue 406. Entries may be dequeued from the work queue 406 and placed into a writer thread 408a-n. The writer thread 408a-n may perform a schema check on the incoming entries. The schema check may include, for example, performing a check on the entries to ensure that they conform to the defined LDAP schema. Entries that do not conform to the defined LDAP schema may be placed in a bad entries log 410. The schema check may also include, for example, performing a check on the incoming entries to ensure that there are no duplicate entries in the input LDIF file and the current directory content. This may include, for example, examining the distinguished name (DN) for each entry. Duplicate entries may be placed into a duplicate entries log 412.

For entries that pass the schema check, the entries may be processed and written to an output file 414a-n.

The system 400 may generate a plurality of output files 414a-n. For example, one output file 414a-n may be generated for each table in the relational schema of the LDAP Server Directory Store. Each of these output files 414a-n contains the data that needs to be loaded into the corresponding table in the relational schema of the LDAP Server Directory Store. Additional files may also be generated.

Parallel Data Load-Append

As explained in the above section, a conversion tool such as Datagen produces a number of output files. The output files may be in a format that is suitable for input to a SQL Loader tool. The SQL Loader tools operate in parallel to load the data into the LDAP Server Directory Store, which is a relational database.

Figure 5:
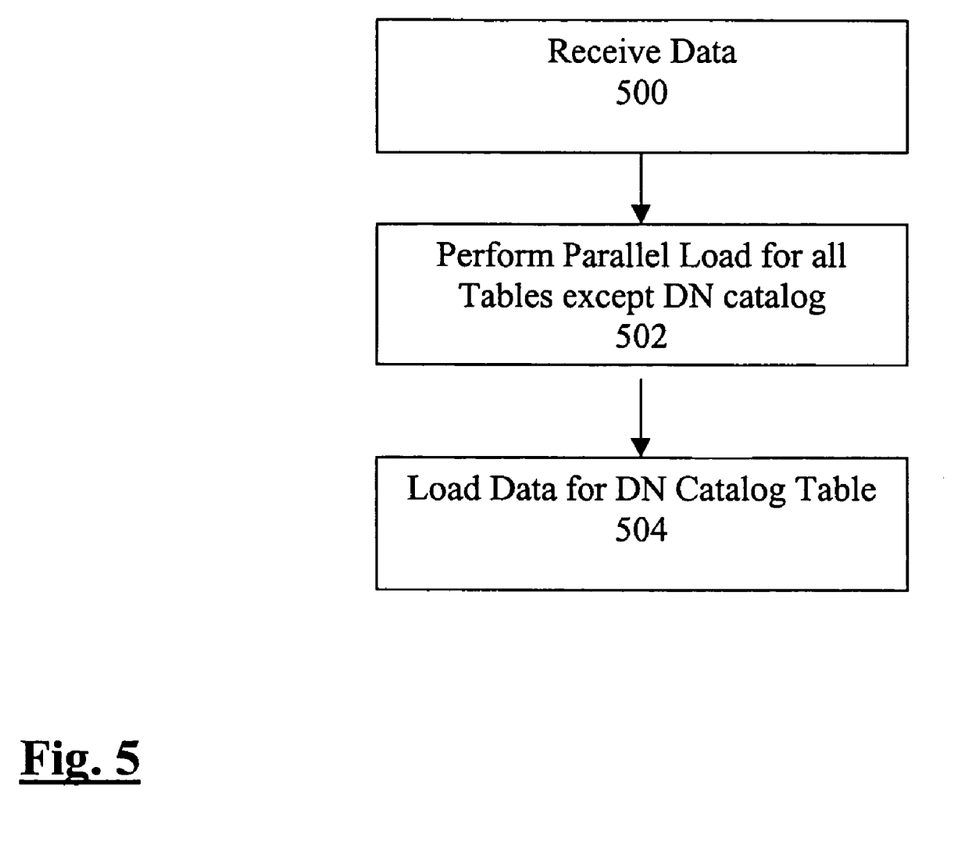
FIG. 5 is a flow chart illustrating a method for performing a data load, in accordance with an embodiment of the invention.

FIG. 5 is a flow chart illustrating a method for loading data. As shown in FIG. 5, data from a plurality of tables may be received 500. In step 502, a parallel load may be performed. This includes, for example, loading the data for all tables except the DN catalog table. A plurality of SQL Loaders may be employed to perform the parallel load of the data into the LDAP Server Directory Store.

The reasons for loading the data for all tables except the DN catalog table are as follows. The LDAP Server, which processes incoming LDAP operation requests, does not recognize entries that are not present in the DN catalog table. Delaying the loading of the DN catalog table ensures that while the data is being added, the LDAP Server is not aware of the data that is in the process of being loaded into the LDAP Server Directory Store.

In step 504, the data for the DN catalog table is loaded. Each row in the catalog table represents the distinguished name (DN) of an entry. As the rows in the DN catalog table are loaded, the LDAP server becomes aware of the new entries and can now access the rest of the data for each entry listed in catalog table.

Figure 6:
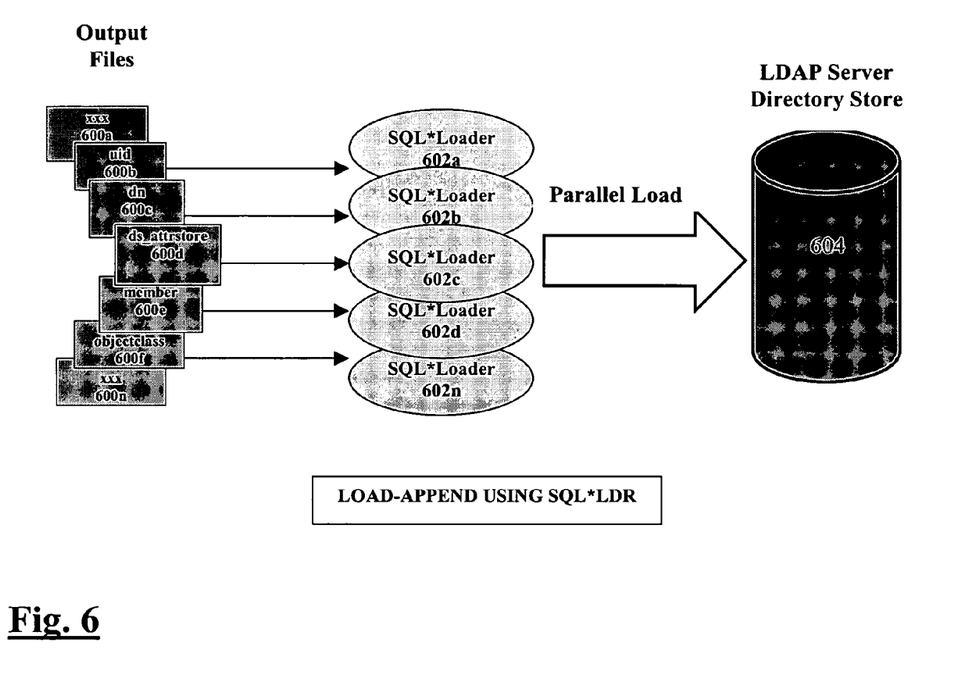
FIG. 6 is a block diagram illustrating a system for performing a data load, in accordance with an embodiment of the invention.

FIG. 6 is a block diagram illustrating a system for loading data. As shown in FIG. 6, data from a plurality of tables 600a-n may be received by a plurality of SQL Loaders 602a-n. The SQL Loaders 602a-n may perform a parallel load into LDAP Server Directory Store 604. The parallel load may include, for example, loading the data for all tables except the DN catalog table. An SQL Loader 602a-n may then load the data for the DN catalog table.

Replication Networks

Systems and methods for performing bulk append in a replication network will now be discussed. Replication networks may contain a plurality of database nodes, and changes to the data may be replicated between the nodes. Because the LDAP Servers at every node contain replications of the same data, the LDAP Servers may be known as "replicas."

In implementations, the "check" and "generate" phase is executed once only. In the case where the deployment has multiple LDAP Servers in replication, the Datagen or other conversion tool may perform the LDAP schema checks against every replica.

The data generated by Datagen or another conversion tool can be loaded into all the replicas, thus ensuring that the entries have been bulk-provisioned into all replicas without replication down time or conflicts.

ADVANTAGES

The systems and methods described above provide many advantages. For example, the systems and methods described above provide the ability to provision entries in bulk to the LDAP Server repository with very good performance, even when the directory has large number of entries and the number of additional entries being provisioned is large.

Furthermore, the bulk-load of the entries happens directly to the directory store without going through the LDAP protocol. This ensures the availability and performance of the LDAP Server processes while the bulk provisioning is in progress.

In addition, the bulk provisioning of entries in a replicated network of LDAP servers happen without affecting the availability and correctness of replication.

Other advantages of the invention will occur to those skilled in the art.

APPLICABILITY

The solution where the LDAP data is directly provisioned into the LDAP Server Directory Store opens up the possibility of solutions to a number of LDAP centric requirements where the change to LDAP repositories are large (LDAP write operations) and the process of going through LDAP protocol is prohibitively expensive. The design adopted in these embodiments can be extended to provide solutions to many such requirements.

System Architecture Overview

Figure 7:
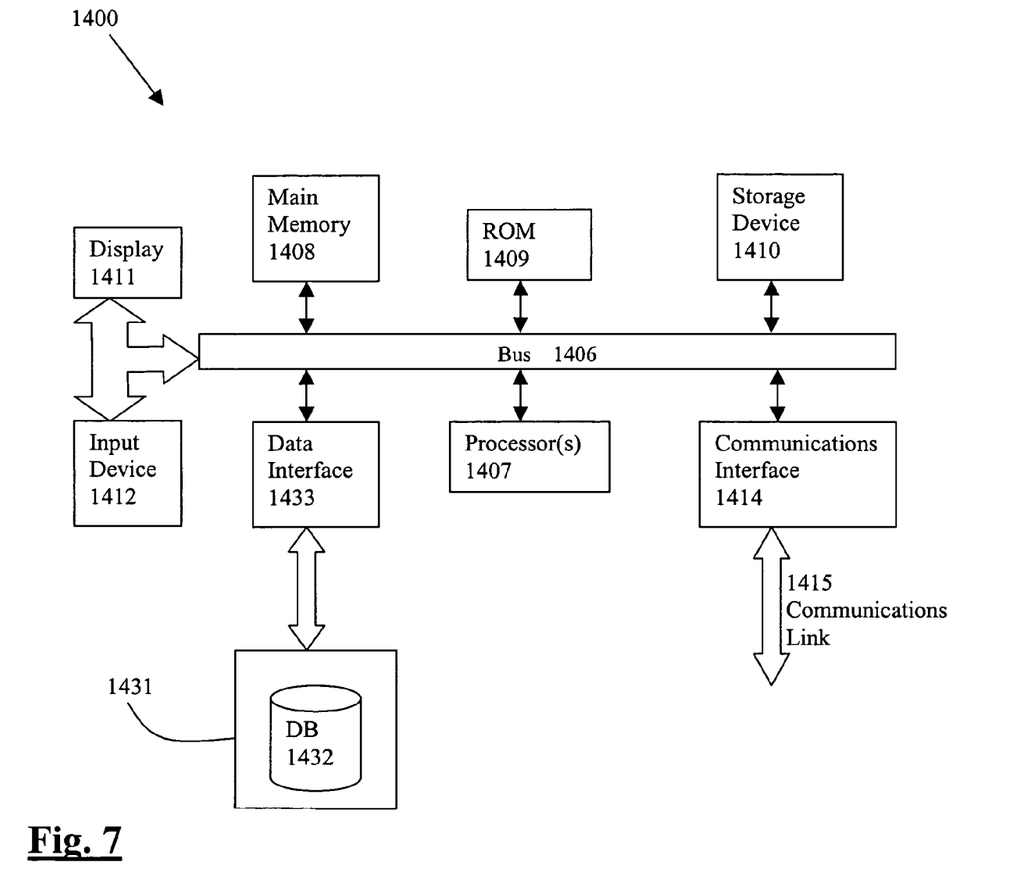
FIG. 7 is a block diagram illustrating a computer system in which embodiments of the invention may be practiced.

The execution of the sequences of instructions required to practice the embodiments may be performed by a computer system 1400 as shown in FIG. 7. In an embodiment, execution of the sequences of instructions is performed by a single computer system 1400. According to other embodiments, two or more computer systems 1400 coupled by a communication link 1415 may perform the sequence of instructions in coordination with one another. Although a description of only one computer system 1400 will be presented below, however, it should be understood that any number of computer systems 1400 may be employed to practice the embodiments.

A computer system 1400 according to an embodiment will now be described with reference to FIG. 7, which is a block diagram of the functional components of a computer system 1400. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem, or the communication link 1415 may be the Internet, in which case the communication interface 1414 may be a dial-up, cable or wireless modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions. Thus, embodiments are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

We claim:

1. A method of adding a plurality of entries into an LDAP database, comprising:
   receiving a file;
   converting the file to a set of intermediate files for a bulk-load operation, the intermediate files being in an LDAP database structure format;
   performing the bulk-load operation by loading the intermediate files in parallel using a processor into an LDAP database structure while ensuring availability of the LDAP database;

preventing data from a table that corresponds with the intermediate files from being loaded, while the intermediate files are being loaded; and loading the table that corresponds with the intermediate files after the intermediate files have been loaded;

wherein the act of loading the intermediate files comprises appending attributes in the intermediate files to a table containing attributes in the LDAP database using a SQL loading tool.

2. The method of claim 1, wherein converting the file to a set of intermediate files comprises:

isolating each attribute in the file into a separate intermediate file.

3. The method of claim 1, wherein the attributes are appended in parallel.

4. The method of claim 1, wherein the converting comprises performing a schema check on entries in the file.

5. The method of claim 4, wherein performing a schema check comprises:

checking that the entries in the file conform to defined LDAP schema; and ensuring that there are no duplicate entries between the existing LDAP database and the file.

6. The method of claim 1, further comprising loading data from a distinguished name catalog table.

7. The method of claim 1, wherein the file is a LDIF file.

8. The method of claim 1, wherein the availability of the LDAP database is ensured by loading the intermediate files into the LDAP database structure without going through a LDAP protocol.

9. The method of claim 1, wherein the intermediate files includes a plurality of output files for respective tables in a relational schema.

10. A system for adding a plurality of entries into an LDAP database, comprising:

a processor and a memory;

a conversion tool capable of receiving a file, and capable of converting the file to a set of intermediate files for a bulk-load operation, the intermediate files being in an LDAP database structure format;

a plurality of SQL loading tools, each capable of loading one intermediate file from the plurality of intermediate files into an LDAP database structure on a volatile or non-volatile computer-useable medium, each SQL loading tool further capable of performing loading in parallel with the other SQL loading tools to perform the bulk-load operation;

means for preventing data from a table from being loaded, while the plurality of intermediate files are being loaded; and means for loading the table after the intermediate files have been loaded;

wherein at least one of the SQL loading tools is implemented using the processor and memory, and is configured to ensure availability of the LDAP database while loading the one intermediate file;

wherein each SQL loading tool is capable of appending attributes in the intermediate files to a table containing attributes in the LDAP database.

11. The system of claim 10, wherein the conversion tool is further capable of isolating each attribute in the file into a separate intermediate file.

12. The system of claim 10, wherein the conversion tool is further capable of performing a schema check on entries in the file.

13. The system of claim 12, wherein performing a schema check comprises:

checking that the entries in the file conform to defined LDAP schema; and ensuring that there are no duplicate entries between the existing LDAP database and the file.

14. The system of claim 10, wherein the one of the SQL loading tools is configured to load data from a distinguished name catalog table after the one intermediate file is loaded.

15. The system of claim 10, wherein the file is a LDIF file.

16. The system of claim 10, wherein the one of the SQL loading tools is configured to ensure availability of the LDAP database by loading the one intermediate file into the LDAP database structure without going through a LDAP protocol.

17. The system of claim 10, wherein the intermediate files includes a plurality of output files for respective tables in a relational schema.

18. A volatile or non-volatile computer-usable medium having instructions thereon, the instructions executable to cause a computer to perform a method comprising:

receiving a file;

converting the file to a set of intermediate files for a bulk-load operation, the intermediate files being in an LDAP database structure format;

performing the bulk-load operation by loading the intermediate files in parallel using a processor into an LDAP database structure while ensuring availability of the LDAP database;

preventing data from a table from being loaded, while the intermediate files are being loaded; and loading the table after the intermediate files have been loaded;

wherein the act of loading the intermediate files comprises appending attributes in the intermediate files to a table containing attributes in the LDAP database using an SQL loading tool.

19. The computer-useable medium of claim 18, wherein converting the file to a set of intermediate files comprises:

isolating each attribute into a separate intermediate file.

20. The computer-useable medium of claim 18, wherein the attributes are appended in parallel.

21. The computer-useable medium of claim 18, wherein the converting comprises performing a schema check on entries in the file.

22. The computer-useable medium of claim 21, wherein performing a schema check comprises:

checking that the entries in the file conform to defined LDAP schema.

23. The computer-useable medium of claim 21, wherein performing a schema check comprises:

ensuring that there are no duplicate entries between the existing LDAP database and the file.

24. The computer-useable medium of claim 18, wherein the method further comprises loading data from a distinguished name catalog table.

25. The computer-useable medium of claim 18, wherein the file is a LDIF file.

26. The computer-useable medium of claim 18, wherein the availability of the LDAP database is ensured by loading the intermediate files into the LDAP database structure without going through a LDAP protocol.

27. The computer-useable medium of claim 18, wherein the intermediate files includes a plurality of output files for respective tables in a relational schema.

* * * * *

UNITED STATES PATENT AND TRADEMARK OFFICE
CERTIFICATE OF CORRECTION

PATENT NO. : 7,962,484 B2  Page 1 of 1
APPLICATION NO. : 11/293021
DATED : June 14, 2011
INVENTOR(S) : Keni et al.

It is certified that error appears in the above-identified patent and that said Letters Patent is hereby corrected as shown below:

On the Title page, Item (73) under "Assignee", line 2, delete "Redwod Shores, CA (US)" and insert
-- Redwood Shores, CA (US) --, therefor.

Signed and Sealed this
First Day of May, 2012

David J. Kappos
*Director of the United States Patent and Trademark Office*